United States Patent Office 2,802,631
Patented Aug. 13, 1957

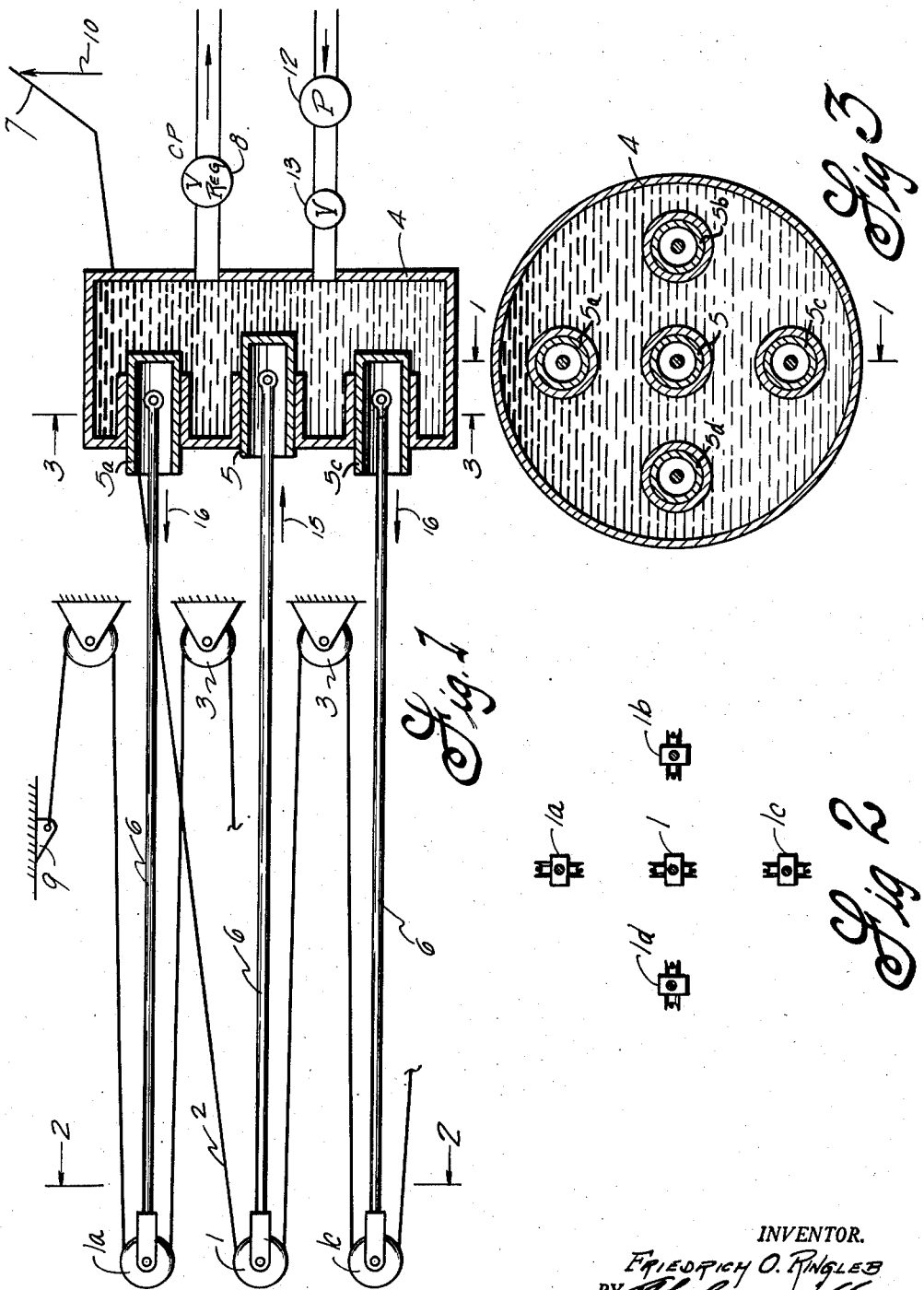

2,802,631

MULTIPLE CYLINDER SHOCK ABSORBER FOR AIRCRAFT ARRESTING GEAR

Friedrich O. Ringleb, Woodbury Heights, N. J.

Application July 6, 1955, Serial No. 520,386

6 Claims. (Cl. 244—110)

(Granted under Title 35, U. S. Code (1952), sec. 266)

The invention described herein may be manufactured and used by or for the Government of the United States of America for governmental purposes without the payment of any royalties thereon or therefor.

This invention relates to shock absorbers for the cable system type where a sudden load is applied to a cable such as, for example, in well-drilling equipment, aircraft landing systems, etc.

In such systems, the problem arises in distributing the stress in the cables and maintaining at all times the proper design of cables to take care of peak stresses and impacts adequately.

An object of this invention is a device which automatically distributes peak stresses in the cables into a constant stress over the entire cable.

Another object of this invention is a hydraulic device which automatically distributes stress load in a cable by creating pressure waves in a hydraulic system, which waves act to pre-tension said cable.

Another object of this invention is a hydraulic device which prevents superpositions of tension peaks in a stressed cable system.

With reference to a cable system in aircraft landing operations, the difficulties with present arresting gears result from the natural mechanical characteristics of the cable as an elastic string. Following the impact of the airplane on the cable, a part of its kinetic energy is stored in the form of tension for a short time in a particular neighborhood of the point of impact. From here, the tension travels along the cable in the form of a stress wave with the velocity $c$ of sound of its material ($c$=approx. 10,000 ft./sec.). This stored energy is not destroyed until the crosshead and piston of the arresting engine obtain an appreciable motion which requires some time due to the inertia of the parts to be moved. However, when the crosshead in present systems begins to move, the tension has not yet traveled up to the end of the cable. Therefore, the motion of the crosshead is produced by a partly stressed cable resulting in slack in the not yet stressed part of the cable. In the meantime, the cable gains more and more longitudinal speed resulting in a new considerable impact at the anchor at the moment when the slack is removed completely. In this way, the non-uniform distribution of the tension, which existed from the beginning, is compounded resulting in heavy stress vibration. This situation becomes worse by the superposition of the following transverse impact of the cable at the deck sheave, reflection of the stress wave at the hook and so on.

It is thus evident that although the present arresting engine finally destroys the energy stored in the cable, it is only after a non-uniform stress distribution over the cable has been maintained and even produced resulting in tension peaks and vibrations.

The present invention is a device which solves the above stress problems by automatically changing the stress peaks in the cable into an equivalent constant stress distribution over the entire cable within a comparatively short period of time.

Figure 1 is a view in cross-section of an operative embodiment,

Figure 2 is a view along section line 2—2, and

Figure 3 is a view along section line 3—3.

The shock absorbing system consists of a hydraulic cylinder with a number of movable pistons, a set of fixed sheaves and a set of movable sheaves, each of the movable sheaves being connected to one of the pistons. The cable in which a shock has to be absorbed is reeved over these sheaves in turn.

There are at least four possible hook-ups from the cable to the shock absorber unit as outlined below:

(1) Closed cable
(2) Open cable
   (a) Ends of cable fixed or anchored
   (b) One end fixed
   (c) Both ends movable Figure 1 depicts a system wherein the two ends of the cable are anchored (hookup 2a).

In the figure, the landing cable 2 is strung around a plurality of movable sheaves 1, 1a, 1b, 1c, and 1d, a plurality of fixed sheaves 3 and anchored by any conventional means such as is shown at 9. Cable 7 is reeved in the following manner: it extends from the landing area adjacent force arrow 10 to a moveable sheave 1 and runs to a fixed sheave 3; it continues to one of the fixed sheaves 3 and returns to the next moveable sheave 1c; the cable then travels back to next of the fixed sheaves 3 and returns again to a moveable sheave 1d; from 1d, it returns to a fixed sheave 3 and back again to a moveable sheave 1b; from the latter sheave, the cable is restrung on a fixed sheave 3, back again to a moveable sheave 1a, then finally anchored at 9 after having passed through another fixed sheave 3. The particular sequence of the cable around the fixed and moveable sheaves is relatively unimportant and can be modified to suit various designs. Sheaves 1, 1a, 1b, and 1c are connected to pistons 5, 5a, 5b and 5c via connecting rods 6. The pistons are slideably mounted in cylinders in the container 4. The container is filled with a hydraulic fluid so that the heads of the pistons are in contact with the fluid at all times. A pressure control valve 8 controls the pressure of the fluid within the container 4. The usual pump 12, and valve 13 are supplied to complete the container's hydraulic circuit. The pump may or may not be used, as desired, depending upon the original design pressure of the fluid within container 4.

In the design of the device the sheaves 1, 1a, 1b, and 1c are situated together as close as possible thereby making container 4 as small as possible in its larger diameter; at the same time, the length of the cable from sheave to sheave is made as long as design permits. The main consideration in such design is to keep the length of the liquid path small compared with the path of the stress wave in the cable.

The operation of the device is as follows: Upon contact of the tail hook (denoted by force arrow 10) of the airplane with the arresting cable 2 at the point of contact 7, an impact wave travels along the cable. For a relatively short interval of time this wave causes sheave 1 to move to the right forcing piston 5 into the fluid and increasing the pressure of the fluid within the container (shown by force arrow 15). This pressure spreads with the velocity of sound $c-1$ of the liquid (about 5,000 ft./sec.) in every direction. Due to the compact construction of the container, the increased pressure can reach and move the pistons of the other cylinders (shown by force arrows 16) before the stress wave in the cable can reach the sheave of the second cylinder.

To illustrate this point, assume an initial distance between a movable sheave 1 and a following fixed sheave 3 as 10 ft. and the cable stress wave travelling at 10,000 ft. sec. The design of the container is made to have, say, 5 ft. as the longest liquid path from 5 to 5a, 5b, 5c, and 5d) and the pressure wave travels at 5,000 ft./sec. within the container. Thus, it takes (2×10)/10,000 or .002 sec. for the stress wave to travel from one movable sheave to the adjacent movable sheave. At the same time, it takes 5/5,000 or .001 sec. for the pressure wave to travel from the first piston (5) to the other piston (5a, 5b, 5c and 5d). The effect of such difference in time is to have a force applied on the heads of each of the pistons 5a, 5b, 5c and 5d (as designated by the arrows) before the stress wave reaches the second movable sheave. As a result, the stress in the cable adjacent the movable sheaves 1a, 1b, 1c and 1d and their adjacent fixed sheaves 3 increases while the stress adjacent the first sheave 1 decreases. This stress distribution continues until the total impact force of the landing gear upon the arresting cable is adjusted for and is finally controlled by the constant pressure valve 8, as determined by pressure setting of such valve. The setting of course, is but a matter of structural design. Pump 12 and valve 13 are of conventional design and are used to replenish the container at a desired pressure at the end of the arresting operation.

Thus with the present system, until the transverse wave reaches the sheave 3, the initial impact stress can be leveled to such an extent that the transverse impact yields a considerably lower impact stress than with present systems. After the transverse impact wave reaches the first fixed sheave 3, the stress distribution will become practically constant because there are no further impacts of appreciable magnitude. In any case, superpositions of tension peaks are prevented.

The ideal multi-cylinder scheme described above is approximated practically by a few small cylinders and an adequate small reeving ratio. However, the sum of the piston areas can be made large with any type of sheave arrangement thereby permitting low pressures in the container 4.

Obviously, other reeving systems and piston and container arrangements than that shown may be used without departing from the spirit of the invention. At the same time a mechanical stress distributor may be substituted for the hydraulic one, also without departing from the spirit of the invention.

In a system of the closed cable type, the shock absorber unit, i. e. the fixed and movable sheaves and the hydraulic cylinder would be the same. However, anchor 9 would be eliminated and the cable 2 would be strung across the flight deck, back to the absorber unit shown and connected to the end of the cable previously anchored to means 9. The operation of the unit is the same as that already described.

The applications of the unit in well-drilling equipment are examples of an open cable with one end fixed (hookup 2b) and an open cable with both ends movable (hookup 2c).

In the former case (hookup 2b), one end of the cable would be anchored and the other end would be strung over the shock absorber unit then allowed to be plunged into the well. Any sudden loads applied to the movable end would be absorbed by the unit as described.

In the latter case (hookup 2c), the fixed end is also allowed to carry a work bit and allowed to be plunged into another well. Any sudden loads applied from either of the two movable ends would be absorbed by the shock absorber unit.

Obviously many modifications and variations of the present invention are possible in the light of the above teachings. It is therefore to be understood that within the scope of the appended claims the invention may be practiced otherwise than as specifically described.

What is claimed is:

1. In a cable type arresting system for moving objects, plurality of independently moveable sheaves and a plurality of fixed sheaves, a cable reeved alternately between the moveable and fixed sheaves, a shock absorbing system, means to connect the moveable sheaves to said shock absorbing system, and means within the shock absorbing system to transmit the effect of the movement of one of said moveable sheaves moved by the stress wave in the cable during an arrestment through the absorbing system to the other independently moveable sheaves before the stress impact wave reaches such other moveable sheaves through the cable.

2. In a shock absorber system, a plurality of fixed sheaves, a plurality of independently moveable sheaves, a cable strung alternately between said sheaves, a container enclosing a body of fluid therein, piston means in said container with the heads of the pistons open to the body of the fluid, and means to connect the piston means to the independently moveable sheaves.

3. In an aircraft arresting system, a landing cable to arrest an aircraft, a stress absorbing unit mounted on each end of the cable, each of said units comprising a plurality of sheaves around which the cable is strung, some of said sheaves being fixed and the remainder of said sheaves being independently moveable, and means connected to the independently moveable sheaves to counter-effect a stress wave set up in the cable upon arrestment of an aircraft.

4. The device of claim 3, wherein the latter means constitute piston means connected to the moveable sheaves, a container containing hydraulic fluid therein, and the piston heads open to the hydraulic fluid.

5. In an arresting system for moving objects, a cable to arrest said objects, a stress absorbing unit connected to said cable, said unit comprising a plurality of moveable sheaves and a plurality of fixed sheaves, said cable being reeved alternately between said moveable and fixed sheaves, piston means connected to the moveable sheaves, a container having hydraulic fluid therein, the heads of said piston means being open to the hydraulic fluid, and the time of $l_c/v_c$ is always greater than the time of $l_f/v_f$ wherein $l_c$ is the length of cable between two adjacently reeved moveable sheaves, $v_c$ is the velocity of the stress wave in the cable on arrestment, $l_f$ is the distance between the piston heads of the two adjacently reeved sheaves, and $v_f$ is the velocity of the pressure wave in the fluid transmitted to the fluid by one of said adjacently reeved sheaves during an arrestment.

6. In a shock absorbing system for aircraft arrestment, a pair of independently moveable sheaves, a fixed sheave, a cable reeved alternately between a moveable sheave and the fixed sheave, said cable being characterized by a stress wave transmission velocity $v_c$, piston means connected to the moveable sheaves, a container containing hydraulic fluid therein, said piston means being open to the hydraulic fluid, said hydraulic fluid being characterized by a pressure wave transmission velocity $v_f$, and the time of travel determined by $l_c/v_c$ is greater than the time computed by $l_f/v_f$ where $l_c$ is the length of cable reeved between the two moveable sheaves, and $l_f$ is the distance between the piston means associated with each moveable sheave in the hydraulic fluid.

References Cited in the file of this patent

UNITED STATES PATENTS

| | | |
|---|---|---|
| 1,499,472 | Pratt | July 1, 1924 |
| 1,516,727 | Hawkins | Nov. 25, 1924 |
| 2,001,007 | Wilson | May 14, 1935 |
| 2,741,445 | Weyerbacher | Apr. 10, 1956 |

FOREIGN PATENTS

| | | |
|---|---|---|
| 663,710 | Great Britain | Dec. 27, 1951 |